United States Patent
Long et al.

(10) Patent No.: US 7,442,747 B1
(45) Date of Patent: Oct. 28, 2008

(54) SULFUR-FUNCTIONALIZED CARBON NANOARCHITECTURES AS POROUS, HIGH SURFACE AREA SUPPORTS FOR PRECIOUS METAL CATALYSTS

(75) Inventors: Jeffrey W Long, Alexandria, VA (US); Debra R Rolison, Arlington, VA (US); Wendy Baker, Lanham, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/828,434

(22) Filed: Jul. 26, 2007

Related U.S. Application Data

(62) Division of application No. 10/985,072, filed on Nov. 5, 2004, now Pat. No. 7,282,466.

(60) Provisional application No. 60/615,243, filed on Oct. 4, 2004.

(51) Int. Cl.
$C08F\ 283/00$ (2006.01)
$C08G\ 8/28$ (2006.01)
$C08G\ 8/02$ (2006.01)
$C08L\ 61/00$ (2006.01)
$C08L\ 61/06$ (2006.01)
$C08L\ 81/00$ (2006.01)

(52) U.S. Cl. .......................... 525/505; 526/904; 528/128
(58) Field of Classification Search ................ 525/505; 526/904; 528/128
See application file for complete search history.

(56) References Cited

U.S. PATENT DOCUMENTS

| | | | | |
|---|---|---|---|---|
| 4,323,698 A | * | 4/1982 | Haag et al. ................. | 560/233 |
| 5,328,961 A | * | 7/1994 | Rossi et al. ................. | 525/206 |
| 5,908,896 A | * | 6/1999 | Mayer et al. ................ | 524/596 |
| 5,993,996 A | * | 11/1999 | Firsich ..................... | 429/231.8 |
| 7,282,466 B2 | * | 10/2007 | Long et al. ................. | 502/185 |

* cited by examiner

*Primary Examiner*—Mark Eashoo
*Assistant Examiner*—Liam J Heincer
(74) *Attorney, Agent, or Firm*—John J. Karasek; Joseph T. Grunkemeyer

(57) ABSTRACT

The invention relates to sulfur-functionalized polymer gels and carbon gels, including aerogels, and such carbon gels containing platinum or metal nanoparticles. The platinum-containing gels may be useful as fuel-cell electrodes.

8 Claims, 4 Drawing Sheets

SULFUR-FUNCTIONALIZED CARBON NANOARCHITECTURES AS POROUS, HIGH SURFACE AREA SUPPORTS FOR PRECIOUS METAL CATALYSTS

This application is a divisional application of U.S. patent application Ser. No. 10/985,072 filed on Nov. 5, 2004, incorporated herein by reference and which claims the benefit of U.S. Provisional Patent Application No. 60/615,243, filed on Oct. 4, 2004.

BACKGROUND OF THE INVENTION

1. Field of the Invention

The invention relates generally to carbon aerogels containing sulfur heteroatom moieties and metal nanoparticles.

2. Description of the Prior Art

Porous carbons are workhorse materials in electrochemistry, featured in electroanalytical, bioanalytical, and electrosynthetic applications, and are used as a conductive binder in fuel cells and batteries. Carbon aerogels, introduced in 1989 (Pekala, *J. Mater. Sci.*, 24, 3221; all referenced publications and patents are incorporated herein by reference), are another class of porous carbon with demonstrated advantages for applications in supercapacitors and capacitive deionization. The morphology of these high-surface-area materials may be tailored by varying synthetic conditions such as the R/C ratio of resorcinol (R) to the polymerization catalyst (C), the reactant weight fraction, the curing strategy, and the pyrolysis conditions. Additionally, carbon aerogels represent a promising alternative to conventional carbon blacks for fuel-cell-catalyst supports because of their through-connected mesoporous/macroporous network for fuel and oxidant transport, monolithic architecture with 3-D electronic connectivity, and large available surface area for the dispersion of catalysts such as those based on Pt group metals.

Carbon aerogels have previously been investigated for fuel-cell applications; in particular, carbon-aerogel-based gas-diffusion electrodes were prepared for use in proton-exchange membrane (PEM) fuel cells (Petricevic et al., *Carbon*, 39, 857 (2001); Glora et al., *J. Non-Cryst. Solids*, 285, 283 (2001). In these studies, membrane-electrode assemblies (MEAs) were prepared by sputtering a Pt catalyst layer onto thin films of carbon-fiber-reinforced carbon aerogels. Although a functional $H_2$/air fuel-cell stack was produced, the power density was a factor of six lower than commercially available electrodes.

Several research groups have devised strategies to prepare metal-modified carbon aerogel composite materials. Dunn and coworkers used chemical vapor deposition to incorporate ruthenium nanoparticles within a carbon aerogel (Miller et al., *Langmuir*, 15, 799 (1998); Miller et al., *J. Electrochem. Soc.*, 144, L309 (1997)). Electrochemical oxidization of the ruthenium to hydrous $RuO_2$ ($RuO_xH_y$) significantly improved the specific capacitance relative to the carbon aerogel alone, demonstrating the electrical addressability of the Ru/$RuO_xH_y$ deposits and the usefulness of metal-modified carbon aerogels for electrochemical applications. Erkey and coworkers developed a supercritical deposition method to incorporate Pt complexes into carbon aerogels, where said complexes could be converted to Pt metal nanoparticles by subsequent thermal processing (Saquing et al., *J. Phys. Chem. B*, 108, 7716 (2004). Additional methods for incorporating metals into carbon aerogels include metal-ion electrosorption and inclusion of noble metal salts in the initial resorcinol-formaldehyde reaction mixture.

SUMMARY OF THE INVENTION

The invention comprises a polymer gel comprising a sulfur functionalization.

The invention further comprises a carbon gel comprising a sulfur group.

The invention further comprises a method of making a composite, comprising the steps of: reacting a phenol with formaldehyde in a condensation reaction to form a precursor gel; and reacting the precursor gel with a sulfur compound to form a sulfur-modified gel.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Figure 1:
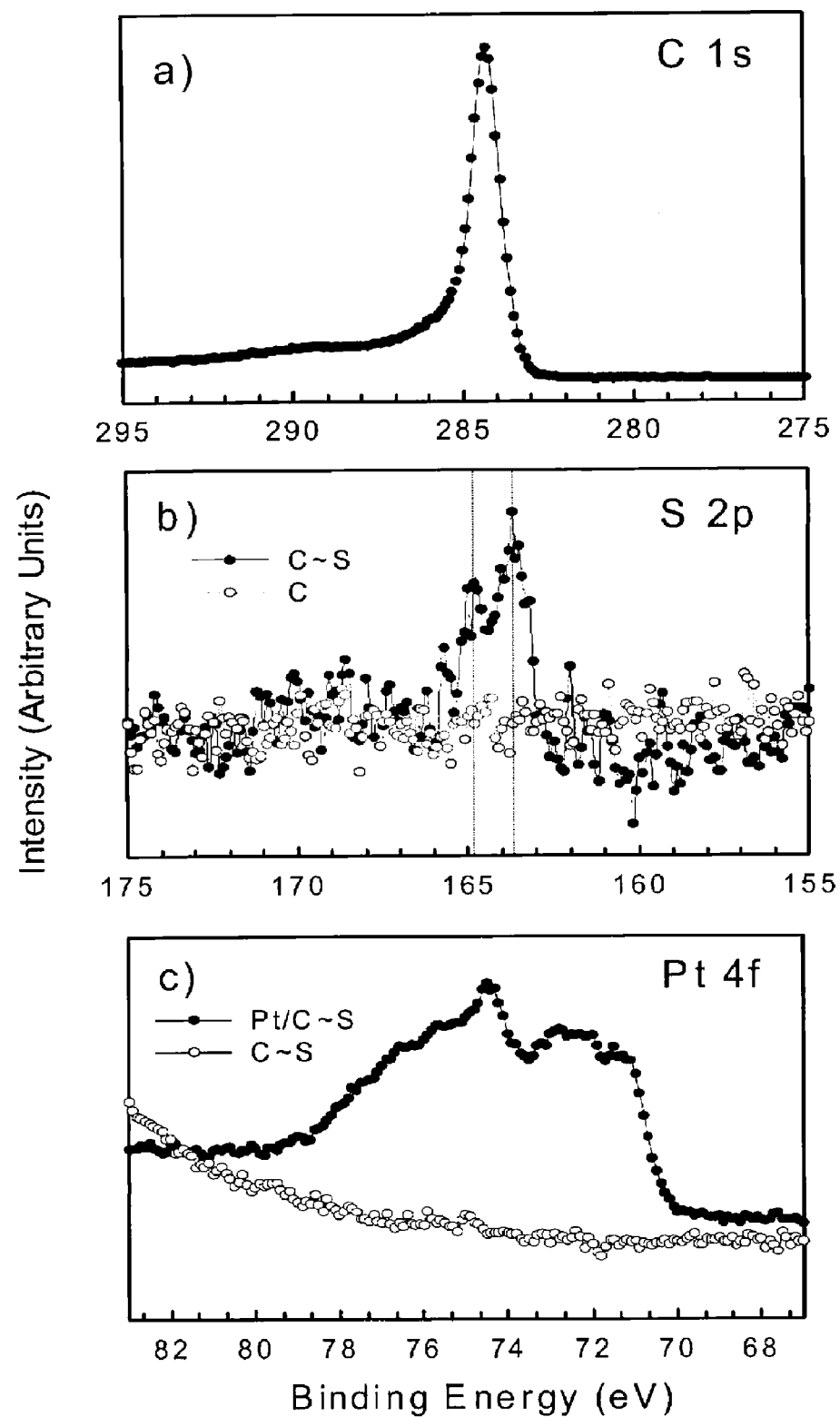
FIG. 1 shows X-ray photoelectron spectroscopy (XPS) data obtained for R/C 200 carbon aerogel samples.

The invention is related to a hypothesis that substantially improved fuel-cell performance would result from distributing nanometer-scale Pt throughout the electrode architecture rather than isolating the catalyst in a single layer between the polymer membrane and the carbon aerogel gas-diffusion electrode (Anderson et al., *Nano Lett.*, 2, 235 (2002); [correction: *Nano Lett.*, 3, 1321 (2003)]; Rolison et al., U.S. Pat. No. 6,695,986), and that successful dispersion of nanometer-scale Pt would be facilitated by designing a chemical anchoring center (i.e., bonding site) into the polymer precursor gel used to prepare carbon aerogels. Furthermore, the tortuosity inherent to aerogels may provide an architectural solution to the problem of fuel crossover in direct methanol fuel cells by increasing the residence time of the methanol fuel within the electrode structure, particularly when the catalyst is well dispersed and fully accessible to the fuel flow-field.

The invention involves preparing carbon aerogels that may support well-dispersed Pt nanoparticle catalysts for application as, for example, catalytic electrode structures. In one embodiment, the strategy is to immobilize noble metal catalysts on carbon aerogels by mimicking the thiophene-mediated binding of metal and metal ions in Vulcan carbon. The carbon aerogel chemically resembles graphite but can exhibit large surface areas (such as >500 $m^2/g$) and high fractional mesoporous pore volumes for effective analyte transport into the carbon nanoarchitecture. In one embodiment, heterocyclic sulfur is incorporated into carbon aerogels by modifying the precursor resorcinol-formaldehyde (RF) gels with 3-thiophenecarboxaldehyde prior to critical point drying and then pyrolyzing the functionalized polymer aerogel to form a sulfur-functionalized, electronically conductive carbon aerogel. The resulting carbon aerogel can retain a thiophene-like functionality and can bind Pt nanoparticles from colloidal suspensions. A possible advantage to this method for immobilizing the noble-metal catalyst is that the chemical bond between the sulfur moieties and metal particle discourages catalyst particle ripening, a critical issue for fuel-cell performance. These functionalized nanoarchitectures may improve the applicability of carbon aerogel electrode structures for fuel cell, semi-fuel cell, and other electrocatalytic applications.

Carbon aerogels can be prepared using a combination of strategies described in the literature (Pekala et al., *Macromolecules*, 26, 5487 (1993); Saliger et al., *J. Non-Cryst. Solids*, 221, 144 (1997); Pekala et al., *J. Non-Cryst. Solids*, 188, 34 (1995)). The synthetic strategy can yield RF and carbon aerogels showing structural similarities to the materials prepared by Saliger et al., who also used a low-temperature synthetic protocol (50° C. compared to the more commonly used 90° C.). While pyrolysis is known to generate significant additional free volume in micropores, the retention of the mesoporous/macroporous network can facilitate rapid fuel/oxidant transport for catalytic application. The retention of this large pore network after pyrolysis can provide an abundance of electrochemically accessible sulfur binding sites for attaching Pt colloids, as supported by TEM and CO adsorption measurements. Reacting a RF gel in low-temperature (50° C.) ethanolic 3-thiophenecarboxlaldehyde/phthaloyl chloride solution can result in sulfur functionalization of the architecture, allowing for binding of preformed catalytic nanoparticles to a pyrolyzed, sulfur-functionalized carbon aerogel.

Because a large fraction of the microporosity for the carbon aerogel can be generated within the polymer network during pyrolysis, the thiophene functionalities from the original RF aerogel may remain sited on the mesoporous and macroporous surfaces, where they were originally tethered. The efficacy of the binding of Pt colloids to C~S aerogels is visibly apparent (FIG. 2), showing that in the powder form, the heteroatom anchor site is readily accessible to nanoscale Pt. It also apparent that sulfur-free carbon aerogel in powder form may only minimally decolorize the Pt sol. This result indicates that a size-based attachment mechanism in which Pt nanoparticles are physically trapped in micropores or occlude micropore mouths may not be spontaneously operative in the as-pyrolyzed, unmodified carbon structure.

The powder-form of the Pt/C~S aerogel can offer similar ORR mass activities as 10 wt % Pt/C model materials (Pt-colloid-modified VC and E-TEK Pt/C), indicating that the ground carbon aerogel acts as an effective mimic the support qualities of Vulcan carbon. The average double-layer capacitance value as measured by cyclic voltammetry (5 mV/s at 300 mV) for the C~S and Pt/C~S material can be 65 F/g, a value which lies within the published range of values for carbon aerogels.

The electronic connectivity of the monolithic carbon aerogel architecture offers a potential advantage for fuel-cell electrode applications. To exploit this advantage, the noble-metal catalyst is integrated into the monolith, a strategy which may present significant experimental difficulties given the high tortuosity and associated low permeability of the aerogel. The macroporous network of the large R/C ratio carbon aerogels may present a solution to this difficulty. An alternative route is to impregnate the metal precursor from solutions of metal salts or complexes into a denser, low R/C thiophene-modified carbon aerogel, followed by a chemical reduction step to form the metal.

In the first step of the process, a phenol is reacted with formaldehyde in a condensation reaction to form a precursor gel. The term "gel" refers to a porous, monolithic material, including, but not limited to, foamy materials and nanofoams. The term also includes powders and films made from such gels. Methods of performing such reactions are known in the art. Suitable phenols include, but are not limited to, resorcinol and phenols having more than one hydroxyl group.

In the next step, the precursor gel is reacted with a sulfur compound to form a sulfur-modified gel. Suitable sulfur compounds include, but are not limited to, 3-thiophenecarboxaldehyde and compounds having a sulfur atom and an aldehyde group. The aldehyde group can react with the precursor gel in the same way as did the formaldehyde during formation of the precursor gel.

The product of these steps can be a polymer gel having a sulfur functionalization, or sulfur-modified gel. The gel may also be made by other methods. An example chemical structure of a suitable gel is shown below. The methylene ether bridges between the phenolic rings originate in the formaldehyde. The ether bridges are formed by coupling of two formaldehydes that had reacted with only one phenolic ring each.

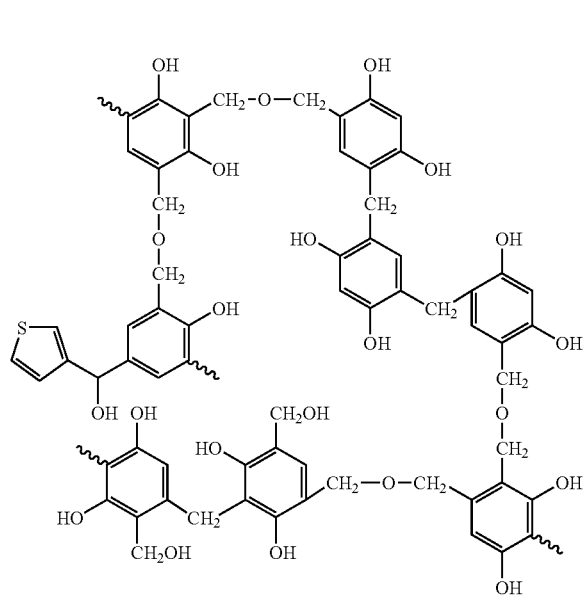

In the next step, the sulfur-modified gel is pyrolyzed. Under the proper conditions, this can convert the polymer gel to a carbon gel. The carbon gel, which may be made by other methods, also comprises sulfur groups. This material is also referred to as a sulfur-functionalized carbon (C~S) gel. The carbon gel can be in the form of an aerogel, an ambigel, or a xerogel. Aerogels can be made by drying above critical-point conditions. There is little collapse of pores during this drying. Xerogels, while still porous, show a higher degree of pore collapse during drying. Ambigels are dried from non-polar, low-surface-tension organic solvents below their critical point.

In the final step, the carbon gel is impregnated with metal nanoparticles, such as platinum nanoparticles. This reaction can produce a carbon gel having metal nanoparticles bound to sulfur functionalizations. A suitable way to perform the impregnation is to expose the sulfur-functionalized carbon aerogel to a colloidal suspension of platinum nanoparticles. Another method is to expose the sulfur-functionalized carbon gel to a platinum salt solution and reducing the C~S-associated platinum to metal. Suitable metal nanoparticles include, but are not limited to, platinum, palladium, platinum alloy, platinum ruthenium alloy, silver, noble metals, and metals capable of bonding to sulfur atoms, e.g., nickel and copper.

Sulfur-functionalized carbon aerogels can possess high surface areas for tethering well-dispersed transition metal catalysts, and extensive through-connected mesopore/macropore networks for effective transport of a target molecule ($H_2$, $O_2$, $CH_3OH$, or other fuels, oxidants, reactants, and analytes) to the active catalytic sites. The sulfur-functionalization procedure has been shown to generate C~S aerogels with sulfur contents similar to those of commercially available Vulcan carbon, as measured by X-ray photoelectron spectroscopy (XPS). Preliminary electrochemical results show that the powder-form of the Pt/C~S aerogel offers similar ORR mass activities as 10 wt % Pt/C model materials (Pt-colloid-modified VC (Vulcan carbon) and E-TEK Pt/C) at low overpotentials, and a 2-fold improvement in catalytic activity at higher overpotentials. The monolithic form of the Pt/C~S aerogel electrode is expected to provide additional benefits. The electronic connectivity of the monolithic carbon aerogel architecture may provide for lowered contact resistance in fuel-cell electrodes over ad hoc contact between carbon black agglomerates. A monolithic electrode structure may also simplify the fabrication of fuel-cell assemblies, and additionally, avoids the use of insulating polymeric binders. The tortuous three-dimensional architecture of the carbon aerogel may also decrease fuel crossover for methanol, a critical issue with DMFCs. This invention is not strictly limited to aerogel-based nanoarchitectures, but is extended to other porous conductive carbons that are derived by the pyrolysis of an aromatic organic polymer containing sulfur heteroatom moieties.

Having described the invention, the following examples are given to illustrate specific applications of the invention. These specific examples are not intended to limit the scope of the invention described in this application.

EXAMPLE 1

Synthesis of Pt/C~S—Resorcinol (99+%, Sigma Aldrich) was mixed with formaldehyde (37 wt % in water), in a 1:2 stoichiometric ratio to form an aqueous solution having a 5 wt % reactant concentration. The resorcinol-formaldehyde (RF) mixture was stirred for 1 hr and the $Na_2CO_3$ catalyst (99.5+%, Aldrich), was added to produce the desired resorcinol-to-catalyst ratio (R/C). The sol was poured into tightly sealed vials and stored in a room-temperature hydration chamber for 2 days, during which the appearance of the organic sol changed from colorless to peach. The sealed vials were then placed in a muffle furnace at 50° C. for 3 days, which produced a dark orange color change in the gels. The gels were soaked in high-purity water (18 MΩ cm water—NANOpure™; Barnstead) for at least 12 hr and then rinsed with ethanol (200 proof, Warner-Graham Company) three times over a period of 2-3 days. Samples designated for thiophene modification were placed in an ethanolic 40 mM 3-thiophenecarboxaldehyde (98%, Aldrich)/2 mM phthaloyl dichloride (Aldrich) solution and soaked at 50° C. for 2 days during which time the reaction solution was replaced once. The samples were then rinsed three times in ethanol over a 24-hr period and six times in acetone over a 2-3 day period. The samples were dried using $CO_2$ in a critical-point dryer (Polaron Range; Quorum Technologies) and pyrolyzed in a tube furnace by ramping from 25° C. to 1000° C. at 4° C./min, annealing at 1000° C. for 1 hr, and ramping back to 25° C. at 4° C./min.

Sulfur-functionalized carbon aerogel samples (C~S) that were to be Pt-modified were ground thoroughly using a mortar and pestle and stirred with a Pt sol having a known weight loading (wt %) of Pt to produce a Pt-modified carbon (Pt/C~S). Adsorption of Pt by the carbon was monitored by the change in appearance of the Pt sol from dark brown to colorless (water-white). The Pt/C~S material was centrifuged and rinsed in high-purity water, centrifuged again, and dried under $N_2$ at room temperature.

Pt-colloid modified Vulcan carbon XC-72 composites (Pt/VC) were prepared and unmodified carbon aerogel was processed using an identical protocol. The Pt sol was prepared by reducing an aqueous solution of $H_2PtCl_6.6H_2O$ with sodium citrate (99.0%, Alfa Aesar) under reflux conditions as described by Henglein et al., *J. Phys. Chem.*, 99, 14129 (1995). The resulting Pt colloids exhibited a size distribution of 1-5 nm and an average diameter of 2.4 nm, as measured by transmission electron microscopy (TEM).

EXAMPLE 2

Microscopic and spectroscopic characterization—Sample chemical composition was determined by XPS (Fissons 220iXL, monochromatic Al—Kα X-ray, spot size 250×1000 μm). Carbon aerogel samples containing Pt were pressed on Sn foil while other carbon aerogel samples were analyzed on In foil. The RF aerogel samples were analyzed on 2000 line-per-inch Au mesh to minimize charging of the insulating organic aerogel. Relative concentrations were determined using the integrated areas of the C1s, S2p, and Pt4f peaks as calculated by the instrument software (Spectrum Processing for Eclipse v2.1, Rev06) using the Scofield constants ($\sigma_{S2p}$=1.68; $\sigma_{C1s}$=1.00; $\tau_{Pt4f}$=15.46). Binding energies were measured to ±0.1 eV. Sample morphology was investigated by analyzing aerogel powders dispersed on holey carbon film using a JEOL 2010F field-emission transmission electron microscope.

The XPS data obtained for R/C 200 carbon aerogel samples are shown in FIG. 1. The C1s peak for the sulfur-functionalized carbon (C~S) aerogel (FIG. 1(a)) at 284.3 eV is indicative of graphitic carbon. FIG. 1(b) shows spectra for two carbon aerogel samples, one which was exposed to the 3-thiophenecarboxaldehyde/phthaloyl chloride solution in its RF state (C~S) and another which was processed similarly, but without exposure to 3-thiophenecarboxaldehyde. Carbon aerogel samples that have been exposed to 3-thiophene-carboxaldehyde/phthaloyl chloride solution in the RF state exhibit $S2p_{3/2}$ and $S2p_{1/2}$ signals at 163.7 and 164.9 eV, respectively. The $S2p_{3/2}$ and $S2p_{1/2}$ peak separation of 1.2 eV agrees with the expected value of 1.18 eV for this spin-orbit doublet, and the peak positions are indicative of elemental sulfur, sulfide, or thiophene-like sulfur. The trace peak at 168.8 eV is located at the expected position for sulfate, a possible side-product of the gel-processing procedure. The S2p peaks are clearly absent in the spectrum of the unmodified carbon, which exhibits only a background response in the 155 to 175 eV region. The synthetic strategy produced sulfur concentrations ranging from 0.1 to 0.9 at % sulfur measured relative to the graphitic carbon signal, and illustrates that the heterocyclic sulfur is retained in the architecture following pyrolysis.

FIG. 1(c) demonstrates that, following exposure of the C~S aerogel to a colloidal suspension of Pt nanoparticles, the Pt was immobilized on the carbon surface, as evidenced by the appearance of the Pt4f doublet peak. Notably, the Pt4f peak is not observed when unmodified carbon aerogel samples are analyzed following exposure to Pt sol. Peak integration of a Pt/C~S (10 wt % Pt) material yielded 1.3 at % Pt, 0.4 at % S, and 98.3 at % C, as detailed in Table 1. These values are similar to those measured for 10 wt % Pt-colloid-modified Vulcan carbon and a commercially available E-TEK 10 wt % Pt/C sample.

TABLE 1

| | At % $S^a$ | At % $C^a$ | At % $Pt^a$ | Mass activity for oxygen reduction (mA/mg Pt at 600 mV)$^b$ | Mass activity for oxygen reduction (mA/mg Pt at 500 mV)$^b$ |
|---|---|---|---|---|---|
| Pt/C~S$^c$ | 0.4 | 98.3 | 1.3 | 3.3 | 14.3 |
| Pt/VC$^c$ | 0.2 | 98.6 | 1.2 | 3.8 | 5.6 |
| Pt/C$^c$ (E-TEK) | 1.1 | 96.6 | 2.3 | 5.0 | 6.0 |

$^a$At % calculated for each element (S, C, or Pt) relative to the combined XPS signal including the other two (C and Pt, S and Pt, or S and C).
$^b$Measured following a potential step from 800 mV (vs. a saturated calomel reference) in an $O_2$-saturated solution.
$^c$All carbon-supported Pt catalyst powders are 10 wt % in Pt.

A similar trend with respect to sulfur content was observed in the XPS data for the RF aerogel samples. As expected, no sulfur signal was observed for the unmodified RF samples while a peak at 163.7 eV was observed for the 3-thiophenecarboxaldehyde-exposed RF (RF~S) samples. Additionally, two Pt4f peaks were observed at 74 eV for RF~S samples previously exposed to Pt sol. Unfortunately, peak broadening due to sample charging prevented reliable quantitation of the relative elemental compositions of the RF and RF~S XPS spectra.

Figure 2:
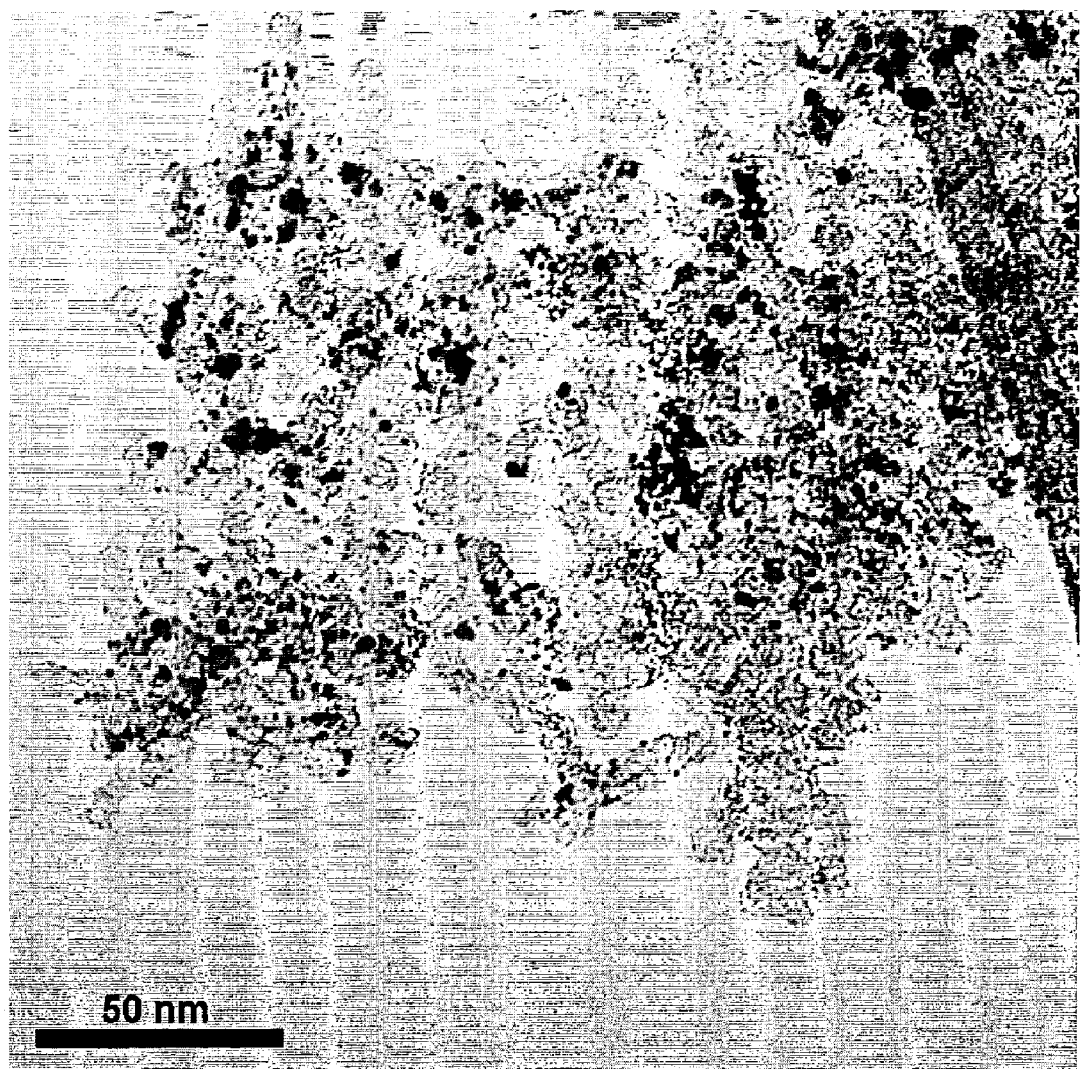
FIG. 2 shows a transmission electron micrograph of a C~S/Pt aerogel sample.

A transmission electron micrograph of a C~S/Pt aerogel sample is shown in FIG. 2. The small dark spots in the image are Pt colloids, which range in size from 1-5 nm. The micrograph shows that the Pt is primarily adsorbed onto the surface of the carbon aerogel particles (light gray), and that the Pt nanoparticles remain mostly unaggregated. Although it is possible that smaller colloids (<1 nm diameter) may adsorb within electrochemically inaccessible micropores, it appears that the majority of the Pt particles are not trapped in small pores, and provide good surface-atom availability within the mesopore/macropore network, which is a design configuration that may optimize the utilization of the Pt catalyst.

EXAMPLE 3

$N_2$ absorption—A porosimetry system (Micromeritics ASAP 2010) configured to perform $N_2$ physisorption (at 77 K) was employed to measure adsorption-desorption isotherms; surface areas were derived using the Brunauer-Emmett-Teller (BET) adsorption isotherm model. Pore-size distributions were determined with the Micromeritics DFT Plus® program using a density functional theory (DFT) model for a slit geometry.

Figure 4:
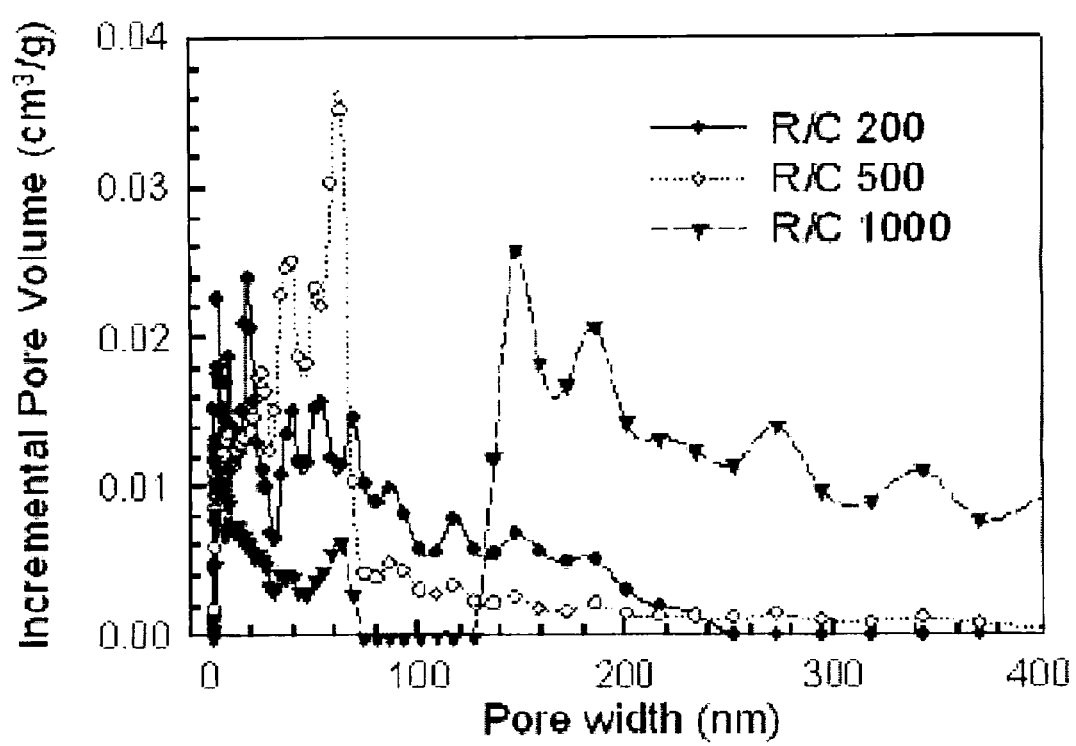
FIG. 4 shows porosity data for aerogels.

The porosimetry results from $N_2$ physisorption are presented in Table 2. Density and porosimetry data for sulfur-free and sulfur-functionalized aerogels (RF and C, and RF~S and C~S, respectively) were similar, indicating that the aerogel architecture is minimally affected by the sulfur functionalization reaction. The RF and carbon aerogel densities for the sulfur-functionalized materials decreased with increasing R/C ratio. This finding is in general agreement with published results for R/C=50 to R/C=300 aerogels prepared using a more traditional synthetic route (90° C. curing and 110 thiophene-functionalization step). Total specific surface areas determined using the BET isotherm model approximately doubled upon pyrolysis. This 2-fold enhancement in surface area is mostly a result of an increase in the microporous area as measured using the t-plot method of the Micromeritics software. The large increased content of micropore area is consistent with the results of Saliger et al., *J. Non-Cryst. Solids,* 221, 144 (1997), who observed that a lower temperature synthetic protocol encouraged the growth of larger RF particles that generate micropores during pyrolysis. The fractional micropore area of the pyrolyzed aerogel also grew with increasing R/C ratio, a result similarly related to the formation of larger particles, which is encouraged in this instance by low catalyst concentrations. Interestingly, the combined mesoporous and macroporous surface areas increased only slightly upon pyrolysis, indicating that the large pore network present in the RF aerogel was not markedly affected by pyrolysis. Notably, the cumulative pore volumes and fractional meso- and macroporous surface areas decreased with increasing R/C ratio for both the RF and carbon aerogels. Despite these decreases, it is apparent that an extensive mesoporous/macroporous network was still present in the high R/C ratio material, as shown in FIG. 4. The DFT data indicate that for extremely low catalyst concentrations (R/C 1000) the incremental volume distributed in macropores dramatically increased.

As a caveat to these porosimetry results, it should be noted that although the RF~S experimental isotherms fit the BET model, negative C-values (or BET-fit intercepts) were obtained when the carbon aerogel isotherms were examined using the BET equation. Negative C-values indicate an unusually weak attraction between the $N_2$ and the carbon aerogel and a poor fit to the BET model. This issue is supported by SAXS micropore analyses of carbon aerogels showing that the BET model dramatically underestimates microporous surface area. Although the absolute values of the BET-generated specific microporous surface areas may be offset, it is reasonable to assume that the mesopore/macropore data, as well as the overall trends in the micropore data, may be used to draw conclusions about the carbon aerogel morphology.

TABLE 2

| sample | density (g/cm$^3$)$^a$ | BET surface area (m$^2$/g) | micropore area (m$^2$/g)$^b$ | fractional microporous area (%) | mesoporous and microporous surface area (m$^2$/g)$^c$ | BJH cumulative pore volume; desorption (cm$^3$/g)$^d$ |
|---|---|---|---|---|---|---|
| RF-R/C 200 | 0.127 | 518 | 156 | 30 | 362 | 0.99 |
| RF~S R/C 200 | 0.110 | 581 | 158 | 27 | 423 | 0.97 |
| RF~S R/C 500 | 0.068 | 300 | 91 | 30 | 209 | 0.54 |
| RF~S R/C 1000 | 0.053 | 223 | 63 | 28 | 160 | 0.36 |
| C-R/C 200 | 0.132 | 996 | 529 | 53 | 476 | 1.13 |
| C~S-R/C 200 | 0.131 | 903 | 466 | 52 | 437 | 1.00 |

TABLE 2-continued

| sample | density (g/cm$^3$)[a] | BET surface area (m$^2$/g) | micropore area (m$^2$/g)[b] | fractional microporous area (%) | mesoporous and microporous surface area (m$^2$/g)[c] | BJH cumulative pore volume; desorption (cm$^3$/g)[d] |
|---|---|---|---|---|---|---|
| C~S-R/C 500 | 0.104 | 742 | 452 | 61 | 290 | 0.76 |
| C~S-R/C 1000 | 0.050 | 705 | 492 | 70 | 213 | 0.42 |

[a]Measured using gravimetric analysis of a geometrically measurable cylindrical sample.
[b]Micropore areas determined by t-plot method.
[c]Mesoporous SA + Macroporous SA = BET SA − Micropore SA (where SA denotes surface area).
[d]Determined for pores between 1.7 and 300 nm in diameter.

EXAMPLE 4

Electrochemical characterization of Pt/C~S powder—Electrochemical measurements were performed using a potentiostat (EG&G PAR model 173) and a sealed three-electrode cell arrangement. A saturated calomel reference electrode (SCE) and a Pt-mesh auxiliary electrode were employed. All potentials are reported versus SCE. The working electrode was prepared following the strategy devised by Schmidt et al., *J. Electrochem. Soc.*, 145, 2354 (1998), for anchoring thin electrocatalyst films onto planar macroelectrodes using a Nafion® ionomeric binder. Catalyst powders were dispersed in 18 MΩ-cm water at a suspension density of 2 mg/mL and sonicated for 15 min. A 20-μL aliquot of the suspension was dropped onto a Teflon®-shrouded 5-mm diameter glassy carbon disk electrode (EDI 10000 RDE tip; Radiometer) and allowed to dry in air. Next, 20 μL of the Nafion® ionomer solution was dropped on top of the carbon layer, and the electrode dried at 70° C. in air for 3-5 min. Before performing $O_2$-reduction experiments, the working electrode was placed in a 1.0 M $H_2SO_4$ solution and cycled between −200 and 800 mV at least 3 times at 5 mV/s. Mass activity measurements were performed following a 3-min chronoamperometric step from 800 mV to the potential of interest in an $O_2$-saturated solution at room temperature. The CO adsorption measurements were performed by bubbling CO into the sealed cell for 5 min at open circuit potential, purging with Ar for 20-30 min, and cycling from 0 to 800 mV in 1.0 M $H_2SO_4$. Surface atom accessibility calculations were performed using integrated CO stripping peaks, calculated atomic dispersions of 57% (based on an average 2.4-nm Pt particle size), and a CO:Pt surface coverage of 0.9.

Figure 3:
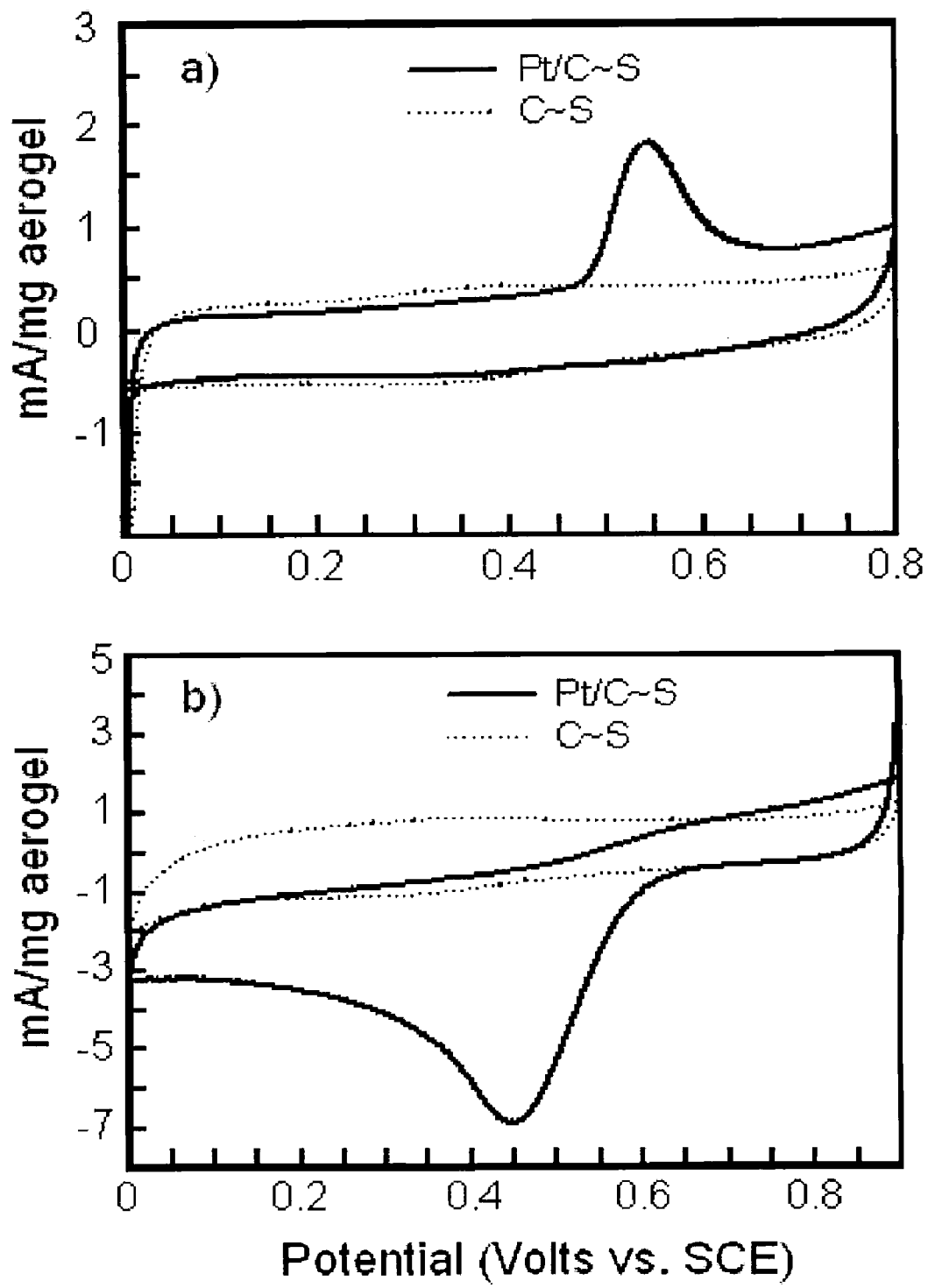
FIG. 3 shows electrochemical results for a C~S/Pt aerogel sample.

The electrochemistry of the Pt/C~S material confirmed that the immobilized nanoscale Pt was electrochemically accessible. FIG. 3(a) shows the voltammetric stripping of CO from a C~S (R/C 200) sample having a 10 wt % loading of colloidal Pt. The CO stripping peak occurs at 542 mV, which is similar to the peak potential of 533 mV observed for 10 wt % Pt-colloid-modified Vulcan carbon. This similarity is reasonable because the colloidal Pt supported on VC and C~S aerogels was prepared identically and thus possesses similar size and chemical speciation.

On the basis of the integrated charge under the CO stripping peak at Pt/C~S, 86% of the Pt surface atoms predicted from the TEM-measured average particle size are electrochemically accessible, confirming that the catalyst is well-dispersed across the aerogel surface. The Pt-free C~S aerogel shows only capacitive current in the CO oxidation region after identical CO exposure, indicating that the carbon aerogel possesses no significant CO binding sites.

FIG. 3(b) shows that the C~S/Pt material exhibits electrocatalytic activity for oxygen reduction in an $O_2$-saturated acidic electrolyte, while the C~S aerogel is, by comparison, catalytically inactive. Preliminary mass activities are detailed in Table 1 for 10 wt % carbon-supported Pt electrocatalysts: Pt/C~S aerogel, Pt/VC, and E-TEK Pt/C. The results show that the E-TEK Pt/C is most active at lower overpotential (600 mV), while the Pt/C~S is two-fold more active than the model materials for oxygen reduction at 500 mV.

Obviously, many modifications and variations of the present invention are possible in light of the above teachings. It is therefore to be understood that the claimed invention may be practiced otherwise than as specifically described.

What is claimed is:

1. A polymer gel comprising a sulfur group, wherein the polymer gel is made by a process comprising the steps of:
   reacting a phenol with formaldehyde in a condensation reaction to form a precursor gel; and
   reacting the precursor gel with a sulfur compound;
      wherein the sulfur compound comprises a sulfur atom and an aldehyde group.

2. The polymer gel of claim 1, wherein the phenol is resorcinol.

3. The polymer gel of claim 1, wherein the phenol is selected from the group consisting of phenols have more than one hydroxyl group.

4. The polymer gel of claim 1, wherein the sulfur compound is 3-thiophenecarboxaldehyde.

5. The polymer gel of claim 1, wherein the sulfur group is elemental sulfur, sulfide, heterocyclic sulfur, or thiophene.

6. A method of making a composite, comprising the steps of:
   reacting a phenol with formaldehyde in a condensation reaction to form a precursor gel; and
   reacting the precursor gel with a sulfur compound to form a sulfur-modified gel;
      wherein the sulfur compound comprises a sulfur atom and an aldehyde group.

7. The method of claim 6, wherein the phenol is resorcinol and the sulfur compound is 3-thiophenecarboxaldehyde.

8. The method of claim 6, wherein the sulfur-modified gel comprises elemental sulfur, sulfide, heterocyclic sulfur, or thiophene.

* * * * *